US010997476B2

(12) United States Patent
Lombardo et al.

(10) Patent No.: US 10,997,476 B2
(45) Date of Patent: May 4, 2021

(54) AUTOMATED CONTENT EVALUATION USING A PREDICTIVE MODEL (71) Applicant: Disney Enterprises, Inc., Burbank, CA (US)

(72) Inventors: Salvator D. Lombardo, Glendale, CA (US); Cristina Segalin, Marina del Rey, CA (US); Lei Chen, Burnaby (CA); Rajitha D. Navarathna, Los Angeles, CA (US); Stephan Marcel Mandt, Santa Monica, CA (US)

(73) Assignee: Disney Enterprises, Inc., Burbank, CA (US)

( * ) Notice: Subject to any disclaimer, the term of this patent is extended or adjusted under 35 U.S.C. 154(b) by 99 days.

(21) Appl. No.: 16/406,632

(22) Filed: May 8, 2019

(65) Prior Publication Data
US 2020/0151524 A1 May 14, 2020

Related U.S. Application Data
(60) Provisional application No. 62/760,728, filed on Nov. 13, 2018.

(51) Int. Cl.
G06K 9/00 (2006.01)
G06K 9/68 (2006.01)
(Continued)

(52) U.S. Cl.
CPC ....... G06K 9/6857 (2013.01); G06K 9/00248 (2013.01); G06K 9/6231 (2013.01);
(Continued)

(58) Field of Classification Search
None
See application file for complete search history.

(56) References Cited

U.S. PATENT DOCUMENTS 10,691,923 B2 * 6/2020 Li .............................. G06T 7/20
2007/0094172 A1 4/2007 Thaler
(Continued)

OTHER PUBLICATIONS

F. Schroff, D. Kalenichenko, and J. Philbin. "Facenet: A Unified Embedding for Face Recognition and Clustering." In Proc. CVPR, 2015. pp. 1-9.

Primary Examiner — Vikkram Bali
(74) Attorney, Agent, or Firm — Farjami & Farjami LLP (57) ABSTRACT There are provided systems and methods for performing automated content evaluation. In one implementation, the system includes a hardware processor and a system memory storing a software code including a predictive model trained based on an audience response to training content. The hardware processor executes the software code to receive images, each image including facial landmarks of an audience member viewing the content during its duration, and for each image, transforms the facial landmarks to a lower dimensional facial representation, resulting in multiple lower dimensional facial representations of each audience member. For each of a subset of the lower dimensional facial representations of each audience member, the software code utilizes the predictive model to predict one or more responses to the content, resulting in multiple predictions for each audience member, and classifies one or more time segment(s) in the duration of the content based on an aggregate of the predictions.

20 Claims, 4 Drawing Sheets (51) Int. Cl.
*G06K 9/62* (2006.01)
*G06N 3/08* (2006.01)
*G06N 3/04* (2006.01)

(52) U.S. Cl.
CPC ......... *G06K 9/6257* (2013.01); *G06K 9/6268* (2013.01); *G06N 3/049* (2013.01); *G06N 3/08* (2013.01)

(56) References Cited

U.S. PATENT DOCUMENTS

| | | | |
|---|---|---|---|
| 2009/0285456 A1* | 11/2009 | Moon | G06K 9/00335 382/118 |
| 2014/0270483 A1* | 9/2014 | Lucey | G06K 9/00302 382/154 |
| 2018/0300751 A1* | 10/2018 | Hammitt | G06T 17/00 |

* cited by examiner

AUTOMATED CONTENT EVALUATION USING A PREDICTIVE MODEL

RELATED APPLICATION(S)

The present application claims the benefit of and priority to Provisional Patent Application Ser. No. 62/760,728, filed Nov. 13, 2018, and titled "Deep Learning Model to Discover Key Segments in TV Shows using Audience Ratings," which is hereby incorporated fully by reference into the present application.

BACKGROUND

Media content in a wide variety of formats is consistently sought out and enjoyed by consumers. Nevertheless, the popularity of a particular item or items of media content, such as a movie, television (TV) series, or a particular TV episode, for example, can vary widely. One approach to evaluating the potential desirability of media content is to use an audience as a focus group to help understand whether a TV episode, for example, is or will be successful.

Traditional approaches used in audience analysis typically require annotated data in order to identify certain expressions in the audience members faces during screening of the content. However, those traditional approaches require extensive manual annotation of large datasets, rendering them expensive and time consuming to prepare. Due to the resources often devoted to developing new content, the accuracy and efficiency with which the desirability of such content to consumers can be evaluated has become increasingly important to producers, owners, and distributors of media content.

SUMMARY

There are provided systems and methods for performing automated content evaluation using a predictive model, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing automated content evaluation using a predictive model, such as an artificial neural network (ANN), for example. It is noted that, as used in the present application, the terms "automation," "automated", and "automating" refer to systems and processes that do not require the participation of a human user, such as a human reviewer or analyst. Although, in some implementations, a human reviewer or analyst may interact with an evaluation provided by the automated systems and according to the automated methods described herein, that human involvement is optional. Thus, the methods described in the present application may be performed under the control of hardware processing components of the disclosed automated systems.

It is further noted that, as defined in the present application, an ANN, or simply neural network (NN) is a type of machine learning framework in which patterns or learned representations of observed data are processed using highly connected computational layers that map the relationship between inputs and outputs. A "deep neural network", in the context of deep learning, may refer to a neural network that utilizes multiple hidden layers between input and output layers, which may allow for learning based on features not explicitly defined in raw data. "Online deep learning" may refer to a type of deep learning in which machine learning models are updated using incoming data streams, and are designed to progressively improve its performance of a specific task as new data is received and/or adapt to new patterns of a dynamic system. As such, various forms of ANNs may be used to make predictions about new data based on past examples or "training data". In various implementations, ANNs may be utilized to perform image processing or natural-language processing.

Figure 1:
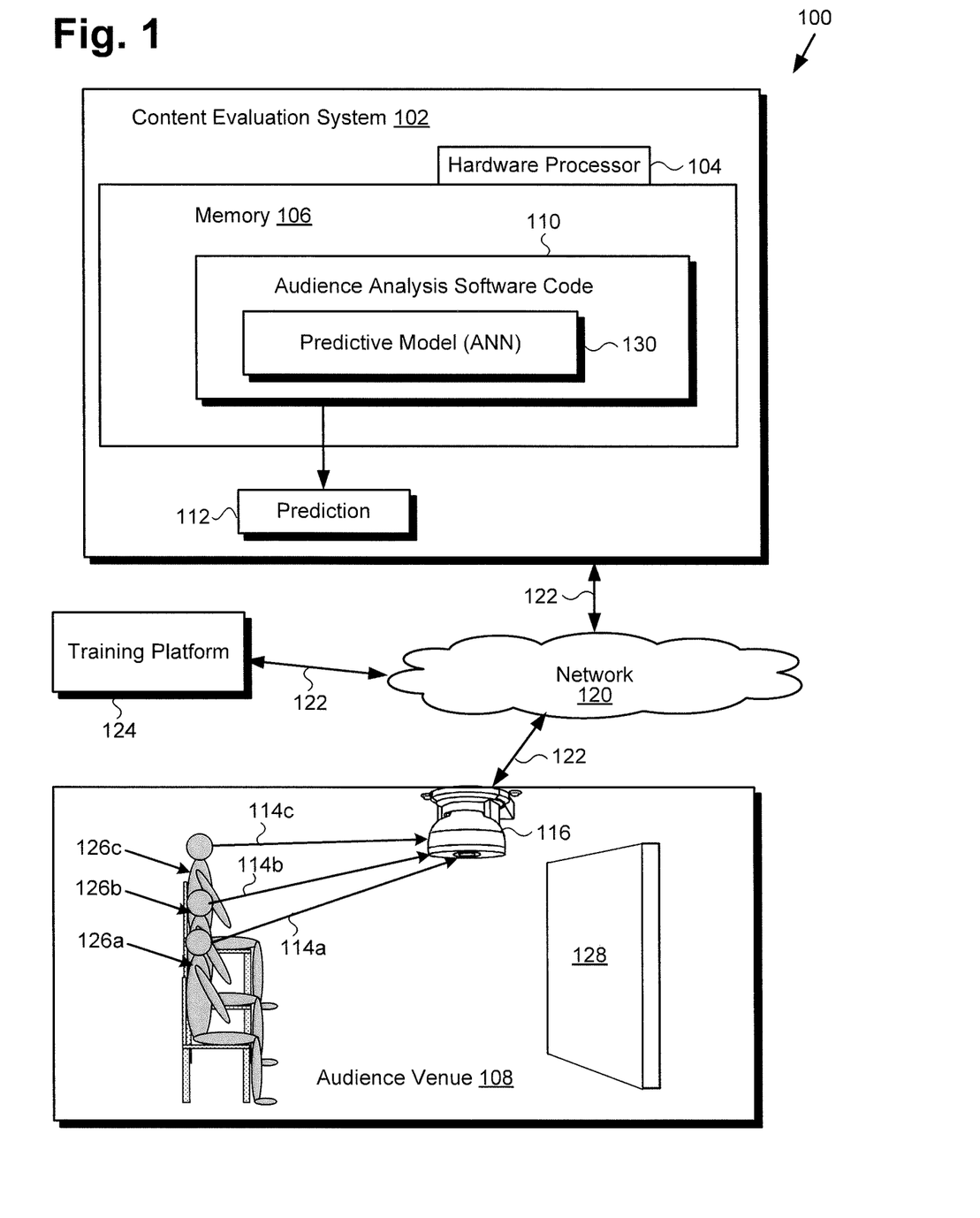
FIG. 1 shows a diagram of an exemplary system for performing automated content evaluation using a predictive model, according to one implementation.

FIG. 1 shows a diagram of an exemplary system for performing automated content evaluation using a predictive model, according to one implementation. As shown in FIG. 1, content evaluation system 102 includes hardware processor 104, and system memory 106 implemented as a non-transitory storage device storing audience analysis software code 110 including predictive model 130 implemented as an ANN (hereinafter "ANN 130"). As further shown in FIG. 1, content evaluation system 102 is implemented within use environment 100 including training platform 124, audience venue 108, and communication network 120.

Audience venue 108 is shown to include multiple audience members 126a, 126b, and 126c, all viewing content 128 while being monitored using camera array 116. Camera array 116 may include one or more still image red-green-blue (RGB) camera(s), and/or one or more RGB video camera(s), and/or one or more infrared (IR) camera(s), for example. Camera array 116 is configured to obtain images 114a, 114b, and 114c of respective audience members 126a, 126b, and 126c while audience members 126a, 126b, and 126c view content 128. Also shown in FIG. 1 are network communication links 122 communicatively coupling training platform 124 and audience venue 108 with content evaluation system 102 via communication network 120.

As further shown in FIG. 1, audience analysis software code 110, when executed by hardware processor 104, is configured to use ANN 130 to generate prediction 112 regarding the response of one or more of audience members 126a, 126b, and 126c to content 128. It is noted that, although the present application refers to audience analysis software code 110 as being stored in system memory 106 for conceptual clarity, more generally, system memory 106 may take the form of any computer-readable non-transitory storage medium.

The expression "computer-readable non-transitory storage medium," as used in the present application, refers to any medium, excluding a carrier wave or other transitory signal that provides instructions to hardware processor 104 of content evaluation system 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts training platform 124 as a computer platform remote from content evaluation system 102, that representation is also merely exemplary. More generally, content evaluation system 102 may include one or more computing platforms, such as computer servers for example, which may form an interactively linked but distributed system, such as a cloud based system, for instance. As a result, hardware processor 104 and system memory 106 may correspond to distributed processor and memory resources within content evaluation system 102, while training platform 124 may be a component of content evaluation system 102 or may be implemented as a software module stored in system memory 106. In one such implementation, content evaluation system 102 may correspond to one or more web servers, accessible over a packet-switched network such as the Internet, for example. Alternatively, content evaluation system 102 may correspond to one or more computer servers supporting a wide area network (WAN), a local area network (LAN), or included in another type of limited distribution or private network.

As discussed above, knowing how an audience responds to a sample of content can be an important decision criterion for producers, owners, and distributors of media content. For example, an audience reaction to a pilot episode of television (TV) content is important for the TV industry to decide which pilots to select for the upcoming year. One of the most important sources of audience response data is via test-screenings. At the end of each test-screening, each audience member may be asked to report how they feel about the viewed content in terms of one global rating (e.g., on a scale of 1 to 10), how enthusiastic they are to see the next episode, also referred to as "intent to view" (ITV), and/or to rate characteristics of the actors, scene locations, action, and soundtrack, for example.

Although such test-screening responses provide a measure of audience response to the content as a whole, it fails to provide information about the audience response to the content while the audience members are viewing the content. By contrast, the automated content evaluation solution disclosed herein utilizes a deep learning approach to generate audience behavioral signals that can capture audience reaction content over time, in real-m time as the content is being viewed. As a result, the present solution advantageously enables identification of particular segments of the content that generate especially positive responses (hereinafter "key segments" or "positive response generating segments").

To that end, the present application discloses a deep neural network model for assessing the engagement of audience members 126a/126b/126c as they view content 128. After a test-screening of content 128, the audience opinion may be obtained through a questionnaire and answer report. In addition, during the test-screening of content 128, a passive sensing system including camera array 116 is used to capture audience behavior over time. In one implementation, the positions of facial landmarks such as eyes, mouth, and so forth, are recorded for the duration of the test-screening.

In some implementations, a variational auto encoder (VAE) can be used to model the facial landmarks in order to extract a lower dimensional feature representation for the face of each of audience member 126a/126b/126c. For example, a set of sixty-eight facial landmarks obtained in each image captured by camera array 116 may be transformed to a ten-dimensional (i.e., lower dimensional) facial representation corresponding to each image. The lower dimensional facial representation and the final per-audience member rating from the questionnaire may be used to train audience analysis software code 110 including ANN 130 implemented as a deep neural network predictive model. Audience analysis software code 110 utilizes ANN 130 to predict a score corresponding to a response of each of audience members 126a/126b/126c to content 128 at any given time based on their respective facial features.

Once trained, audience analysis software code 110 provides a (predicted) rating as a function of time for each of audience member 126a/126b/126c. The final score for a given audience member can be predicted by aggregating their scores over the duration of the content. Moreover, in some implementations, the scores for several or all of audience members 126a/126b/126c may be aggregated to evaluate content 128. Those automated evaluations can have useful interpretations such as identifying key segments in content 128, or segments within content 128 during which positive-rating groups of audience members diverge from negative-rating groups.

Figure 2:
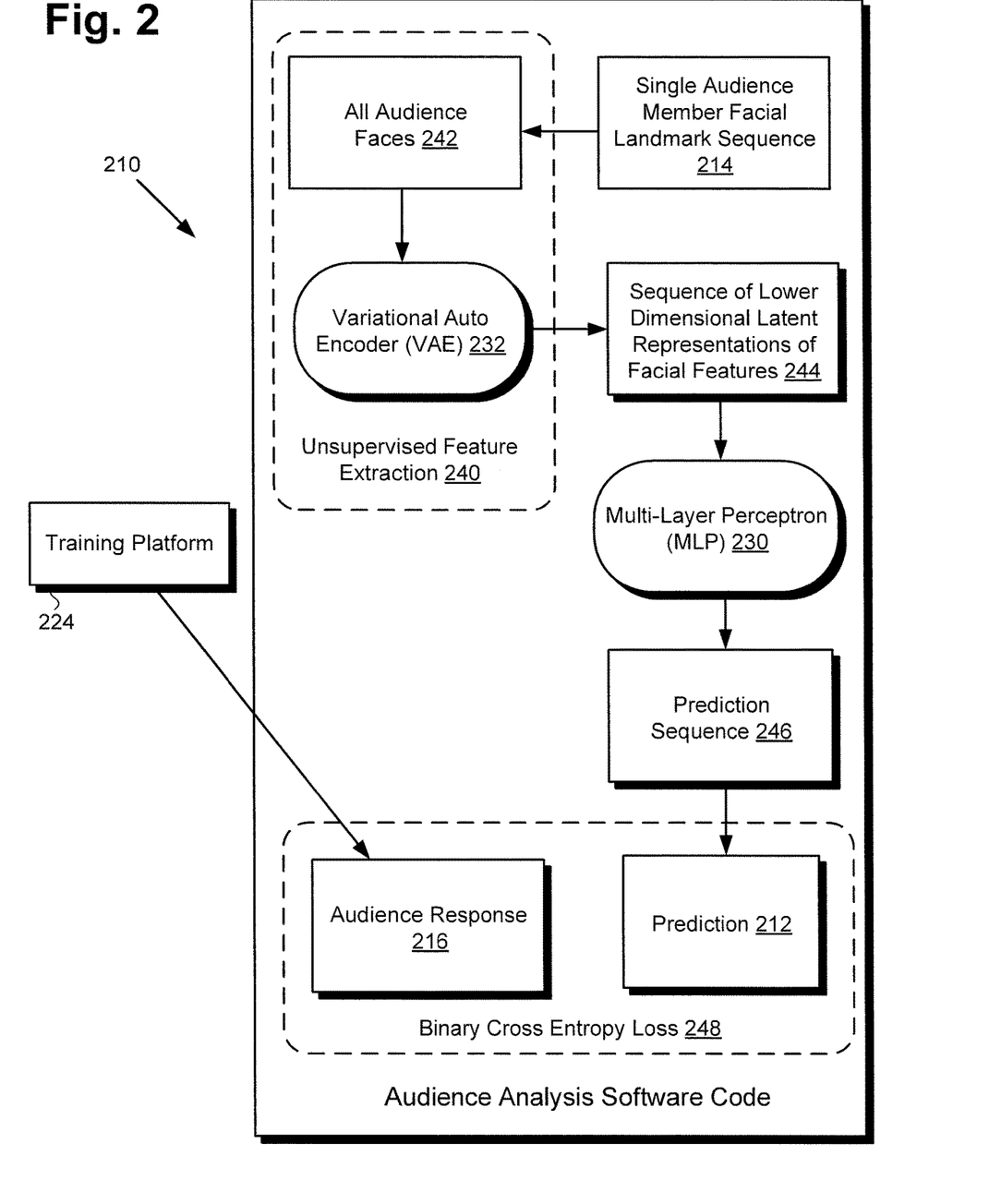
FIG. 2 shows an exemplary audience analysis software code suitable for use by the system shown by FIG. 1, according to one implementation.

FIG. 2 shows exemplary audience analysis software code 210 suitable for use by content evaluation system 102, in FIG. 1, according to one implementation. As shown in FIG. 2, audience analysis software code 210 includes unsupervised feature extraction block 240 receiving single audience member facial landmark sequence 214 and providing sequence of lower dimensional latent representations 244 of facial features of audience members 126/126b/126c, in FIG. 1, as an output to ANN 230 implemented as multi-layer perceptron (MLP) 230. As further shown in FIG. 2, unsupervised feature extraction block 240 is configured to utilize variational auto encoder (VAE) 232 to transform facial landmarks of all audience faces 242 of each of audience members 126a/126b/126c to lower dimensional latent representations 244 of facial features of each of audience members 126a/126b/126c.

Audience analysis software code 210 also includes binary cross entropy loss block 248 receiving prediction sequence 246 from MLP 230, as well as audience response 216. Also shown in FIG. 2 is training platform 224 providing audience response 216 for use in training audience analysis software code 210. It is noted that audience response 216 may take the form of a survey and/or questionnaire completed by audience members 126a/126b/126c after viewing content 128 as training content. In other words, in some implementations, audience response 216 to training content 128 may be a self-reported audience response by audience members 126a/126b/126c, rather than an audience response interpreted by human annotators observing features of audience members 126a/126b/126c as they view training content 128.

Audience analysis software code 210 and training platform 224 correspond respectively in general to audience analysis software code 110 and training platform 124, in FIG. 1. As a result, audience analysis software code 110 and training platform 124 may share any of the characteristics attributed to respective audience analysis software code 210 and training platform 224, and vice versa. Thus, although not shown in FIG. 1, audience analysis software code 110 may include features corresponding to unsupervised feature extraction block 240 with VAE 232, MLP 230, and binary cross entropy loss block 248.

In addition, MLP 230, in FIG. 2, corresponds in general to ANN 130, in FIG. 1, and those corresponding features may share any of the characteristics attributed to either feature by the present disclosure. That is to say, in some implementations, ANN 130, like MLP 230 may be implemented using a multi-layer perceptron architecture. Moreover, single audience member facial landmark sequence 214 corresponds in general to each of images 114a/114b/114c of respective audience members 126a/126b/126c while audience members 126a/126b/126c view content 128.

Figure 3:
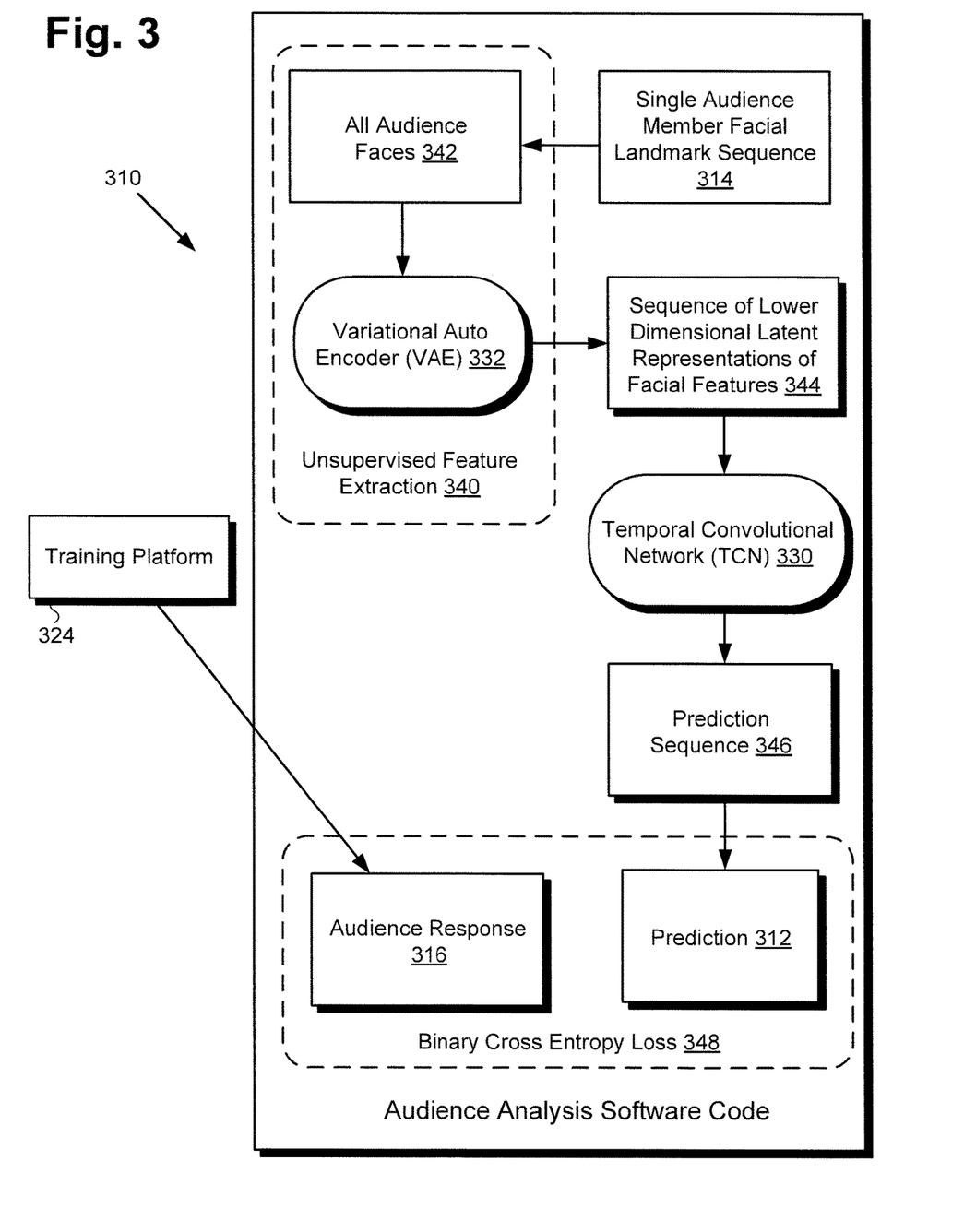
FIG. 3 shows an exemplary audience analysis software code suitable for use by the system shown by FIG. 1, according to another implementation.

FIG. 3 shows exemplary audience analysis software code 310 suitable for use by content evaluation system 102, in FIG. 1, according to another implementation. As shown in FIG. 3, audience analysis software code 310 includes unsupervised feature extraction block 340 receiving single audience member facial landmark sequence 314 and providing sequence of lower dimensional latent representations 344 of facial features of audience members 126a/126b/126c, in FIG. 1, as an output to ANN 330 implemented as temporal convolutional network (TCN) 330. As further shown in FIG. 3, unsupervised feature extraction block 340 is configured to utilize VAE 332 to transform facial landmarks of all audience faces 342 of each of audience members 126a/126b/126c to lower dimensional latent representations 344 of facial features of each of audience members 126a/126b/126c.

Audience analysis software code 310 also includes binary cross entropy loss block 348 receiving prediction sequence 346 from TCN 330, as well as audience response 316. Also shown in FIG. 3 is training platform 324 providing audience response 316 for use in training audience analysis software code 310. It is noted that audience response 316 may take the form of a survey and/or questionnaire completed by audience members 126a/126b/126c after viewing content 128 as training content. In other words, in some implementations, audience response 316 to training content 128 may be a self-reported audience response by audience members 126a/126b/126c, rather than an audience response interpreted by human annotators observing features of audience members 126a/126b/126c as they view training content 128.

Audience analysis software code 310 and training platform 324 correspond respectively in general to audience analysis software code 110/210 and training platform 124/224, in FIGS. 1 and 2. As a result, audience analysis software code 110 and training platform 124 may share any of the characteristics attributed to respective audience analysis software code 310 and training platform 324, and vice versa. Thus, although not shown in FIG. 1, audience analysis software code 110 may include features corresponding to unsupervised feature extraction block 340 with VAE 332, TCN 330, and binary cross entropy loss block 348.

In addition, TCN 330, in FIG. 3, corresponds in general to ANN 130, in FIG. 1, and those corresponding features may share any of the characteristics attributed to either feature by the present disclosure. That is to say, in some implementations, ANN 130, like TCN 330 may be implemented using a temporal convolutional network architecture. Moreover, single audience member facial landmark sequence 314 corresponds in general to each of images 114a/114b/114c of respective audience members 126a/126b/126c while audience members 126a/126b/126c view content 128.

Figure 4:
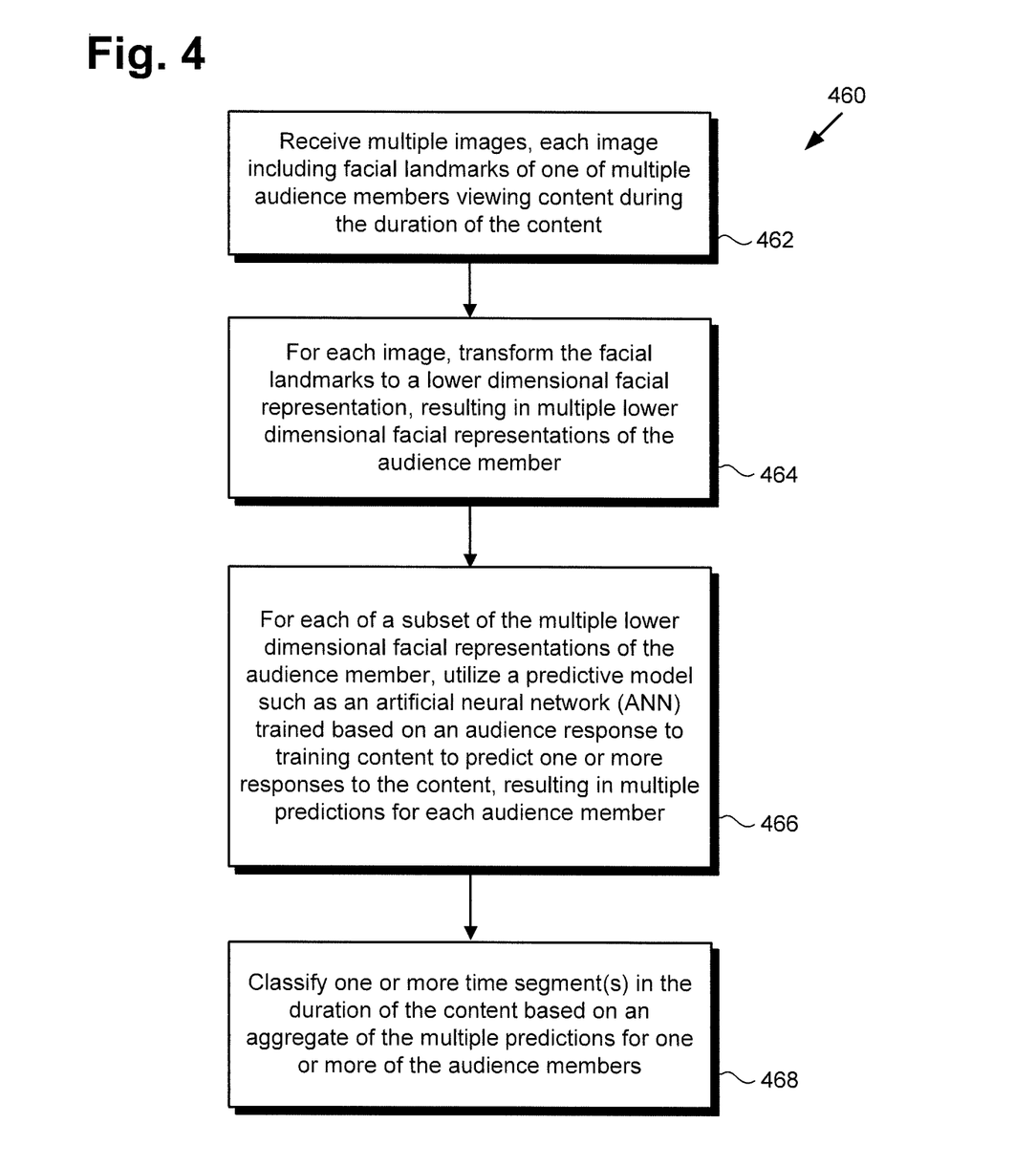
FIG. 4 is a flowchart presenting an exemplary method for use by a system to perform automated content evaluation using a predictive model.

The functionality of content evaluation system 102 including audience analysis software code 110/210/310 will be further described by reference to FIG. 4 in combination with FIGS. 1, 2, and 3. FIG. 4 shows flowchart 460 presenting an exemplary method for use by a system to perform automated content evaluation using a predictive model. With respect to the method outlined in FIG. 4, it is noted that certain details and features have been left out of flowchart 460 in order not to obscure the discussion of the inventive features in the present application.

As a preliminary matter, it is noted that ANN 130/230/330 is trained based on audience response 216/316 to training content 128. In other words, audience response 216/316 may be used as labels for the training content 128 to form a training data set. According to one implementation of the training process, audience members 126a/126b/126c are segregated into two groups, a positive response group and a negative group, using a threshold. This thresholding yields a binary label $y^i = \pm 1$ for the ith audience member specifying whether the audience member belongs to the positive or negative response group. The problem can then be formulated as using a machine learning model, i.e., ANN 130/230/330 to predict the label $y^i$ given the input of the audience member's face $x_{t=1:T}^i$ throughout the viewing of training content 128 by the audience member. The output of the model is a scalar prediction $\hat{y}^i$ which is the model's prediction for the response (positive or negative) of the ith audience member to training content 128.

As noted above, in one implementation, the dataset used to train ANN 130/230/330 includes images 114a/114b/114c/214/314 containing facial landmark sequences 214 and audience response 216/316 to training content 128. The facial landmarks may be computed at a rate of twelve frames per second, for example. Audience response 216/316 is drawn from the survey that audience members 126a/126b/126c completed after viewing training content 128. The questions in the survey include audience demographic information such as education level, age, and gender, as well as their positive or negative response to the content. In one implementation only the answer to the question: "How much effort would you put forth, on a scale from 1 as lowest effort to 10 as highest effort, to watch the next episode in a TV series beginning with training content 128?" is used to determine audience response 216/316. i.e., ITV question.

It was observed that training content in the form of television comedy elicited consistently different responses from audience members than training content in the form of television dramas. For comedy, an audience member response to the ITV question discussed above of 6 or greater was classified as a positive response, while a response to the ITV question of 5 or less was classified as negative. For drama, the border between positive and negative responses was more difficult to identify precisely. As a result, only more extreme responses to the ITV question were classified as positive or negative. Specifically, for drama, only audience member responses of 9 or 10 to the ITV question were classified as positive, and only audience member responses of 3 or less were classified as negative.

During training, audience response 216/316 by each of audience members 126a/126b/126c to training content 128 is compared to prediction 112/212/312 about the respective responses of audience members 126a/126b/126c generated by ANN 130/230/330. For example, in some implementations, ANN 130/230/330 is trained by minimizing a binary cross entropy loss comparing audience response 216/316 with prediction 112/212312.

Referring now to FIG. 4 in combination with FIGS. 1, 2, and 3, flowchart 460 begins with receiving images 114a/114b/114c/214/314 each including facial landmarks of one of audience members 126a/126b/126c viewing content 128 during the duration of content 128 (action 462). Content 128 may take many forms. For example, in some implementations, content 128 may be TV programming content, such as a pilot for or an episode of a television comedy series or television drama series. Alternatively, content 128 may include movie content, music content, a video game, or a live performance, to name a few additional examples.

The facial data obtained from images 114a/114b/114c/214/314 includes dozens of key facial landmarks per audience member at each moment during viewing of content 128 by audience members 126a/126b/126c. In one implementation, for example, sixty-eight distinct facial landmarks may be obtained from each of images 114a/114b/114c/214/314. Examples of such facial landmarks may include the location of eye centers, eye corners, mouth corners, ear positions, and so forth. As noted above, in one implementation, the facial landmarks included in images 114a/114b/114c/214/314 may be obtained at a rate of twelve frames per second.

Images 114a/114b/114c/214/314 including facial landmarks of audience members 126a/126b/126c while they view content 128 may be received by audience analysis software code 110/210/310 of content evaluation system 102, executed by hardware processor 104. As shown in FIG. 1, in one implementation, images 114a/114b/114c/214/314 may be obtained by camera array 116 of audience venue 108, and may be received by content evaluation system 102 from camera array 116 via communication network 120 and network communication links 122.

Flowchart 460 continues with, for each of images 114a/114b/114c/214/314, transform the facial landmarks to a lower dimensional facial representation, resulting in multiple lower dimensional facial representations of each of audience members 126a/126b/126c (action 464). Referring to FIGS. 2 and 3, action 464 corresponds to transforming all audience faces 242/342 to sequence of lower dimensional latent representations 244/344 of facial features using VAE 232/332. In one implementation, for example, an unsupervised feature extraction procedure is performed using VAE 232/332 of unsupervised feature extraction block 240/340.

VAE 232/332 is trained to transform the facial landmarks obtained from all audience faces 242/342 to the lower dimensional latent representation of the face of each of audience members 126a/126b/126c for each of images 114a/114b/114c/214. For example, in the exemplary implementation described above in which sixty-eight facial landmarks are obtained from each of images 114a/114b/114c/214/314, VAE 232/332 may perform a transformation that reduces the dimensionality of the sixty-eight facial landmarks into a ten-dimensional latent representation shown as sequence of lower dimensional latent representations 244/244 of facial features. Transformation of the facial landmarks obtained from all audience faces 242/342 into sequence of lower dimensional latent representations 244/344 of facial features in action 464 may be performed by audience analysis software code 110/210/310 of content evaluation system 102, executed by hardware processor 104, and using VAE 232/332 as noted above.

As noted above, content 128 may correspond to a content genre such as comedy or drama, for example. The lower dimensional latent representations 244/344 representations of the audience member produced in action 464 are behavior signals by the audience member during the duration of the content that relate to the content genre.

Flowchart 460 continues with, for each of a subset of the sequence of lower dimensional latent representations 244/344 of facial features of each of audience members 126a/126b/126c, utilize a predictive model such as ANN 130/230/330 to predict one or more response(s) to content 128, resulting in prediction sequence 246/346 for each of audience members 126a/126b/126c (action 466). Action 466 may be performed by audience analysis software code 110/210/310 of content evaluation system 102, executed by hardware processor 104, and using ANN 130/230/330, as discussed below.

As shown in FIG. 2, in some use cases, it may be advantageous or desirable to implement ANN 130/230/330 as MLP 230. In one such implementation, MLP 230 may include three fully connected layers, each with a hidden dimension of 128, for example. According to that model, each lower dimensional facial representation $x_i^t$ in sequence 244 is sent to a multi-layer perceptron configured to generate a scalar output $\hat{y}_t^i$ that can be seen as prediction sequence 246 for audience member i at a series of specific moments t during viewing of content 128. These frame predictions 246 can be summed to yield a final prediction 112/212 for the response of each of audience members 126a/126b/126c to content 128 as a whole, as expressed by Equation 1:

$$\hat{y}^i = \text{sum}(\{\hat{y}_t^i\}_{t=1:T}).$$

It is noted that MLP 230 looks at each face of each of audience members 126a/126b/126c independently in order to make a predicted score 112/212 for the audience member.

As shown in FIG. 3, in some use cases, it may be advantageous or desirable to implement ANN 130/230/330 as TCN 330. While MLP 230, in FIG. 2, treats each face in a sequence independently, in some use cases it may be preferable to use a series of faces (for example several image frames in sequence) in order to generate each entry in prediction sequence 346. For example, a single face measurement could be noisy due to detection failure or an extreme pose by one of audience members 126a/126b/126c. In addition, the dynamics of facial landmarks revealed by sequential images might bear extra information that a single static measurement of the facial landmark does not capture.

Thus, in some implementations, MLP 230 used for single faces may be substituted by TCN 330 configured to perform convolutions over several faces in order to make a prediction. In other words, TCN 330 operates on subsets of lower dimensional facial representations 344, where each subset includes more than one lower dimensional facial representation of one of audience members 126a/126b/126c. That is to say, instead of taking each single face as an input, each layer of TCN 330 performs a temporal convolution on the output of the previous layer.

In one implementation, TCN 330 may include a single temporal convolutional layer with a kernel size of 12 and stride 6. However, in other implementations, TCN 330 may include multiple temporal convolutional layers. As a specific example of those latter implementations, TCN 330 may include two temporal convolutional layers, the output of the first layer going through a max-pooling layer and a rectified linear unit (ReLU) activation layer before going to the second temporal convolutional layer, which may be of kernel size 3 and stride 1.

Analogously to MLP 230, TCN 330 generates prediction sequence 346 $\{\hat{y}_t^i\}_{t=1:T}$. However, prediction sequence 346 is generated based on subsets of the lower dimensional facial representations 344 produced by action 464, rather than on each individual lower dimensional facial representation 244 as performed by MLP 230. Like prediction sequence 246, prediction sequence 346 can be summed according to Equation 1 above to yield a final prediction 112/312 for the response of each of audience members 126a/126b/126c to content 128 as a whole. In one implementation, the one or more predicted responses may take the form one or more predicted survey ratings for content 128 as a function of time.

Exemplary flowchart 460 may conclude with classifying one or more time segment(s) (key segments) in the duration of content 128 based on an aggregate of predictions 112/212/312 for one or more of audience members 126a/126b/126c (action 468). For comedy content, for example, key segments may correspond to time segments of content 128 during which audience members 126a/126b/126c are detected to be smiling or laughing. For drama, key segments may not correlate as well with smiling or laughter, but may correspond to time segments during which audience members 126a/126b/126c exhibit attentiveness to content 128, for example.

In some implementations, it may be advantageous or desirable to classify one or more key segments of content 128 based on prediction sequence 246/346 for a subgroup of audience members 126a/126b/126c. For example, in some use cases it may be desirable to distinguish key segments enjoyed by male audience members from those enjoyed by female audience members, or to distinguish between key segments popular with different age groups. However, in other implementations, it may be advantageous or desirable to classify one or more key segments of content 128 based on the responses of substantially all of audience members 126a/126b/126c. In those implementations, prediction sequence 246/346 and/or prediction 112/212/312 may be aggregated for all of audience members 126a/126b/126c.

Thus, the present application discloses systems and methods for performing automated content evaluation using a predictive model. The content evaluation solution disclosed by the present application automatically generates behavioral signals based on audience ITV ratings and facial landmarks. The present solution advantageously requires relatively little audience data and is cost effective. Moreover, the present streamlined and cost effective automated solution can provide results that are highly correlated with sophisticated and often expensive proprietary audience analysis software. Consequently, the present automated content evaluation solution advantageously enables the identification of key segments within a presentation based on behavioral signals from audience members, without using proprietary software or other costly commercial tools.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A content evaluation system comprising:
   a hardware processor and a system memory;
   a software code stored in the system memory, the software code including a predictive model trained based on an audience response to a training content;
   the hardware processor configured to execute the software code to:
   receive a plurality of images each including a plurality of facial landmarks of one of a plurality of audience members viewing a content during a duration of the content;
   for each of the plurality of images, transform the plurality of facial landmarks to a lower dimensional facial representation, resulting in a plurality of lower dimensional facial representations of the one of the plurality of audience members;
   for each of a subset of the plurality of lower dimensional facial representations of the one of the plurality of audience members, utilize the predictive model to predict one or more responses to the content as a function of time, resulting in a plurality of predictions for each of the plurality of audience members; and
   classify at least one time segment in the duration of the content based on an aggregate of the plurality of predictions for the plurality of audience members.

2. The content evaluation system of claim 1, wherein the predictive model is an artificial neural network (ANN), and wherein the ANN is trained by minimizing a binary cross entropy loss comparing an audience response to the training content predicted by the ANN to the audience response.

3. The content evaluation system of claim 1, wherein the software code further comprises a variational auto encoder trained to transform the plurality of facial landmarks to the lower dimensional facial representation of the one of the plurality of audience members for each of the plurality of images.

4. The content evaluation system of claim 1, wherein the predictive model comprises a multi-layer perceptron.

5. The content evaluation system of claim 1, wherein each subset of the plurality of lower dimensional facial representations of the one of the plurality of audience members includes a plurality of lower dimensional facial representations.

6. The content evaluation system of claim 1, wherein the predictive model comprises a temporal convolutional network (TCN).

7. The content evaluation system of claim 6, wherein the TCN comprises only one temporal convolutional layer.

8. The content evaluation system of claim 6, wherein the TCN comprises a plurality of temporal convolutional layers.

9. The content evaluation system of claim 1, wherein the content corresponds to one of a plurality of content genres, wherein the plurality of lower dimensional facial representations of the one of the plurality of audience members comprise a plurality of behavior signals for the one of the audience members during the duration of the content, and wherein the plurality of behavior signals comprise at least one behavior relating to the one of the plurality of content genres.

10. The content evaluation system of claim 1, wherein the one or more predicted responses comprises one or more predicted survey ratings for the content as a function of time.

11. A method for use by a content evaluation system including a hardware processor and a system memory storing a software code including a predictive model trained based on an audience response to a training content, the method comprising:

receiving, by the software code executed by the hardware processor, a plurality of images each including a plurality of facial landmarks of one of a plurality of audience members viewing a content during a duration of the content;

for each of the plurality of images, transforming, by the software code executed by the hardware processor, the plurality of facial landmarks to a lower dimensional facial representation, resulting in a plurality of lower dimensional facial representations of the one of the plurality of audience members;

for each of a subset of the plurality of lower dimensional facial representations of the one of the plurality of audience members, predicting, by the software code executed by the hardware processor and using the predictive model, one or more responses to the content as a function of time, resulting in a plurality of predictions for each of the plurality of audience members; and classifying, by the software code executed by the hardware processor, at least one time segment in the duration of the content based on an aggregate of the plurality of predictions for the plurality of audience members.

12. The method of claim 11, wherein the predictive model is an artificial neural network (ANN), and wherein the ANN is trained by minimizing a binary cross entropy loss comparing an audience response to the training content predicted by the ANN to the audience response.

13. The method of claim 11, wherein the software code further comprises a variational auto encoder trained to transform the plurality of facial landmarks to the lower dimensional facial representation of the one of the plurality of audience members for each of the plurality of images.

14. The method of claim 11, wherein the predictive model comprises a multi-layer perceptron.

15. The method of claim 11, wherein each subset of the plurality of lower dimensional facial representations of the one of the plurality of audience members includes a plurality of lower dimensional facial representations.

16. The method of claim 11, wherein the predictive model comprises a temporal convolutional network (TCN).

17. The method of claim 16, wherein the TCN comprises only one temporal convolutional layer.

18. The method of claim 16, wherein the TCN comprises a plurality of temporal convolutional layers.

19. The method of claim 11, wherein the content corresponds to one of a plurality of content genres, wherein the plurality of lower dimensional facial representations of the one of the plurality of audience members comprise a plurality of behavior signals for the one of the audience members during the duration of the content, and wherein the plurality of behavior signals comprise at least one behavior relating to the one of the plurality of content genres.

20. The method of claim 11, wherein the one or more predicted responses comprises one or more predicted survey ratings for the content as a function of time.

* * * * *